(12) United States Patent
Pelouch et al.

(10) Patent No.: US 9,985,727 B2
(45) Date of Patent: May 29, 2018

(54) FEEDBACK CONTROLLED RAMAN AMPLIFICATION IN OPTICAL SYSTEM

(71) Applicant: Xtera Communications, Inc., Allen, TX (US)

(72) Inventors: Wayne S. Pelouch, McKinney, TX (US); Stephen Michael Webb, Gravesend (GB); John G. Ellison, Colchester (GB)

(73) Assignee: Neptune Subsea IP Limited, London (GB)

( * ) Notice: Subject to any disclaimer, the term of this patent is extended or adjusted under 35 U.S.C. 154(b) by 307 days.

(21) Appl. No.: 14/697,039

(22) Filed: Apr. 27, 2015

(65) Prior Publication Data
US 2015/0311975 A1   Oct. 29, 2015

Related U.S. Application Data

(60) Provisional application No. 61/985,232, filed on Apr. 28, 2014.

(51) Int. Cl.
*H04B 10/079*   (2013.01)
*H04B 10/25*   (2013.01)
(Continued)

(52) U.S. Cl.
CPC ... *H04B 10/07953* (2013.01); *H01S 3/06754* (2013.01); *H01S 3/1301* (2013.01);
(Continued)

(58) Field of Classification Search
CPC .............. H04B 10/077; H04B 10/0775; H04B 10/2916; H04B 10/506; H04B 2210/072
(Continued)

(56) References Cited

U.S. PATENT DOCUMENTS 6,785,042 B1   8/2004   Onaka et al.
7,729,615 B1 *  6/2010   Zeffler ................. H04B 10/077
                                                                    398/34
(Continued)

FOREIGN PATENT DOCUMENTS

EP   1309111   5/2003
WO   2012085563   6/2012

OTHER PUBLICATIONS

PCT/US2015/27779, Notification of Transmittal of the International Search Report and the Written Opinion of the International Searching Authority, or Declaration dated Jul. 17, 2015. (12 pages).

*Primary Examiner* — David Payne
*Assistant Examiner* — Tanya Motsinger (57) ABSTRACT

An optical communication link that includes two nodes interconnected by an optical channel that comprises optical fiber(s), and that is used to communicate an optical signal comprising multiple optical signal wavelengths. The first node provides an optical signal onto the optical channel towards the second node, or receives an optical signal from the optical channel from the second node. A Raman pump provides Raman pump power into the optical fiber of the optical channel to thereby perform Raman amplification of the optical signal in the optical fiber. The second node determines a quality measurement of at least of optical wavelength signals transmitted by the first node to the second node. The second node also transmits information from the quality measurement back to the first node. A controller at the first node controls at least one parameter of the Raman pump in response to this transmitted information.

20 Claims, 5 Drawing Sheets

(51) Int. Cl.
*H04J 14/02* (2006.01)
*H04B 10/077* (2013.01)
*H04B 10/291* (2013.01)
*H01S 3/067* (2006.01)
*H01S 3/13* (2006.01)
*H01S 3/094* (2006.01)
*H01S 3/30* (2006.01)

(52) U.S. Cl.
CPC ..... *H04B 10/0777* (2013.01); *H04B 10/2504* (2013.01); *H04B 10/2916* (2013.01); *H04J 14/02* (2013.01); *H01S 3/094003* (2013.01); *H01S 3/094096* (2013.01); *H01S 3/302* (2013.01)

(58) Field of Classification Search
USPC .......................................................... 359/334
See application file for complete search history.

(56) References Cited

U.S. PATENT DOCUMENTS

| | | | |
|---|---|---|---|
| 2002/0048062 A1* | 4/2002 | Sakamoto | H04B 10/0775 398/30 |
| 2002/0097480 A1* | 7/2002 | Dominic | H01S 3/302 359/333 |
| 2004/0004754 A1* | 1/2004 | Mailhot | H01S 3/302 359/334 |
| 2004/0037569 A1* | 2/2004 | Kamalov | H04B 10/07953 398/162 |
| 2004/0070819 A1* | 4/2004 | Farley | H01S 3/1301 359/341.4 |
| 2004/0100684 A1* | 5/2004 | Jones | H01S 3/2383 359/337.11 |
| 2006/0082866 A1* | 4/2006 | Takahashi | H04B 10/2916 359/334 |
| 2006/0126159 A1* | 6/2006 | Chung | H01S 3/06754 359/334 |
| 2007/0109628 A1* | 5/2007 | Zhou | H01S 3/1301 359/333 |
| 2007/0223925 A1* | 9/2007 | Ohtani | H04B 10/506 398/79 |
| 2009/0060499 A1* | 3/2009 | Chung | H04B 10/0795 398/34 |
| 2009/0074019 A1* | 3/2009 | Wong | H01S 5/183 372/26 |
| 2014/0268308 A1* | 9/2014 | Pelouch | H01S 3/302 359/334 |
| 2014/0270757 A1* | 9/2014 | van Lochem | H04J 14/02 398/34 |
| 2015/0311975 A1* | 10/2015 | Pelouch | H04B 10/07953 398/27 |

\* cited by examiner

FEEDBACK CONTROLLED RAMAN AMPLIFICATION IN OPTICAL SYSTEM

CROSS-REFERENCE TO RELATED APPLICATIONS

This application claims the benefit under 35 U.S.C. § 119(e) of U.S. provisional patent application Ser. No. 61/985,232, filed Apr. 28, 2014, which provisional patent application is hereby incorporated herein by reference in its entirety.

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optic signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

Embodiments described herein relate to an optical communication link that includes two nodes interconnected by an optical channel that comprises optical fiber(s), and that is used to communicate an optical signal comprising multiple optical signal wavelengths. The first node includes an optical channel interface for providing an optical signal onto the optical channel towards the second node, or for receiving an optical signal from the optical channel from the second node. A Raman pump provides Raman pump power into the optical fiber of the optical channel to thereby perform Raman amplification of the optical signal in the optical fiber. The second node includes a signal quality determination mechanism for determining a quality measurement of at least one of optical wavelength signals transmitted by the first node to the second node. The second node also has a communication interface for transmitting information from the quality measurement back to the first node. A controller at the first node controls at least one parameter of the Raman pump in response to this transmitted information. Accordingly, a flexible mechanism for adaptively adjusting Raman pump power is herein described.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Embodiments described herein relate to an optical communication link that includes two nodes interconnected by an optical channel that comprises optical fiber(s), and that is used to communicate an optical signal comprising multiple optical signal wavelengths. The first node includes an optical channel interface for providing an optical signal onto the optical channel towards the second node, or for receiving an optical signal from the optical channel from the second node. A Raman pump provides Raman pump power into the optical fiber of the optical channel to thereby perform Raman amplification of the optical signal in the optical fiber. The second node includes a signal quality determination mechanism for determining a quality measurement of at least one of optical wavelength signals transmitted by the first node to the second node. The second node also has a communication interface for transmitting information from the quality measurement back to the first node. A controller at the first node controls at least one parameter of the Raman pump in response to this transmitted information. Accordingly, a flexible mechanism for adaptively adjusting Raman pump power is herein described.

Figure 1:
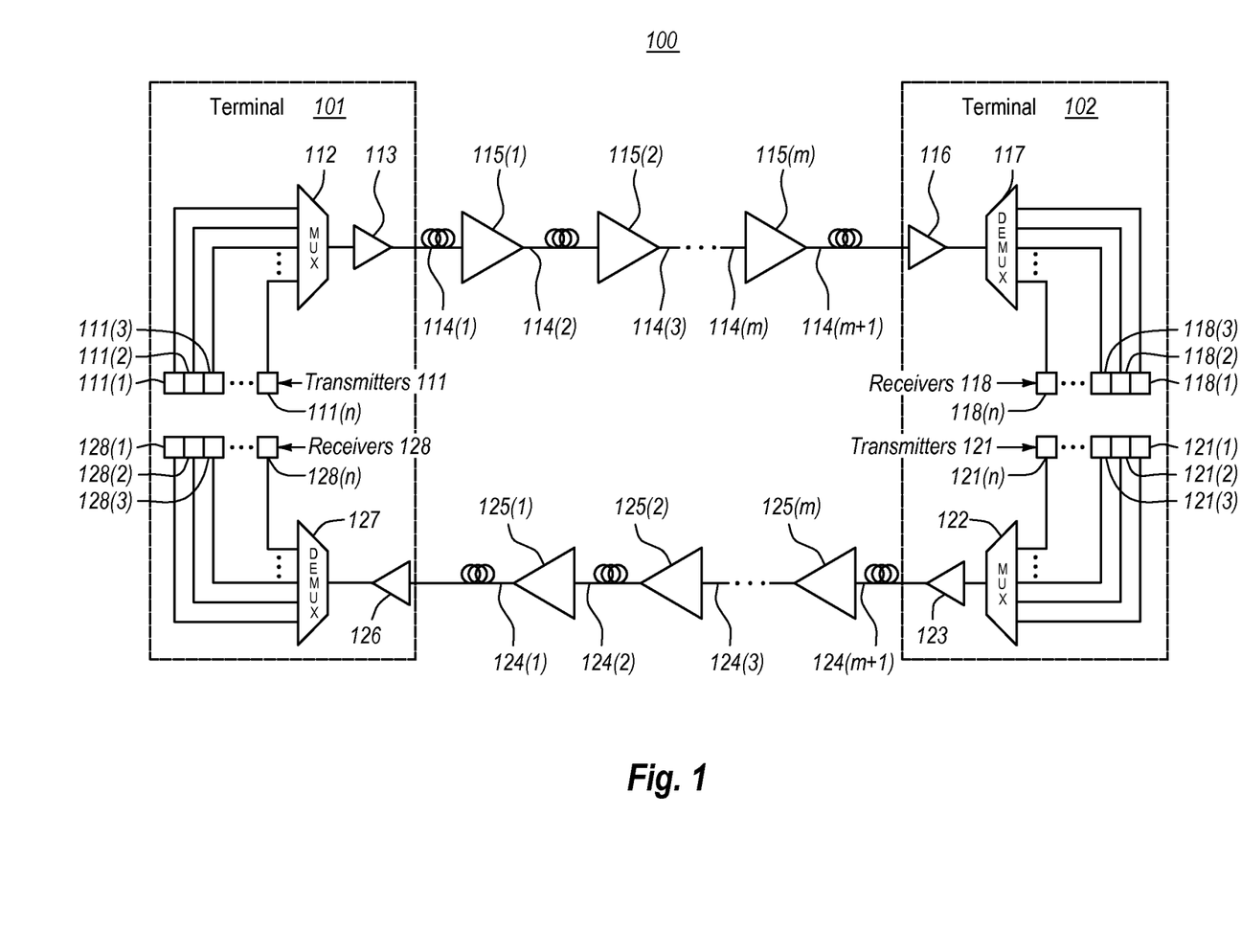
FIG. 1 illustrates an optical communication system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Signals that fall within the particular frequency will be referred to as respective optical wavelength signals. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel. The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first fiber link 114(1).

There are a total of "m" repeaters and "m+1" optical fiber links between the terminals 101 and 102 in each of the eastern and western channels. However, there is no requirement for the number of repeaters in each of the eastern and western channels to be equal. For instance, there are "m" repeaters 115 and "m+1" optical fiber links 114 in the eastern channel. In an unrepeated optical communication system, "m" would be zero such that there is but a single fiber link 114(1) and no repeaters between the terminals 101 and 102. In a repeated optical communication system, "m" would be one or greater. Each of the repeaters, if present, may consume electrical power to thereby amplify the optical signals.

The eastern optical signal from the final optical fiber link 114(m+1) is then optionally amplified at the terminal 102 by the optional optical amplifier 116. The eastern optical signal is then demultiplexed into the various wavelength optical wavelength channels using optical demultiplexer 117. The various optical wavelength channels may then be received and processed by corresponding optical receivers 118 including receivers 118(1) through 118(n).

As for the western channel for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first fiber link 124(m+1). If the western optical channel is symmetric with the eastern optical channel, there are once again "m" repeaters 125 (labeled 125(1) through 125(m)), and "m+1" optical fiber links 124 (labeled 124(1) through 124(m+1)). Recall that in an unrepeated environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeated system) for high-quality single mode fiber might be about 50 kilometers, and in practice may range from 30 kilometers or less to 100 kilometers or more. That said, the principles described herein are not limited to any particular optical path distances between repeaters, nor are they limited to repeater systems in which the optical path distances are the same from one repeated segment to the next.

The optical communications system 100 is represented in simplified form for purpose of illustration and example only. The principles described herein may extend to much more complex optical communications systems. The principles described herein may apply to optical communication systems in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction.

Figure 2:
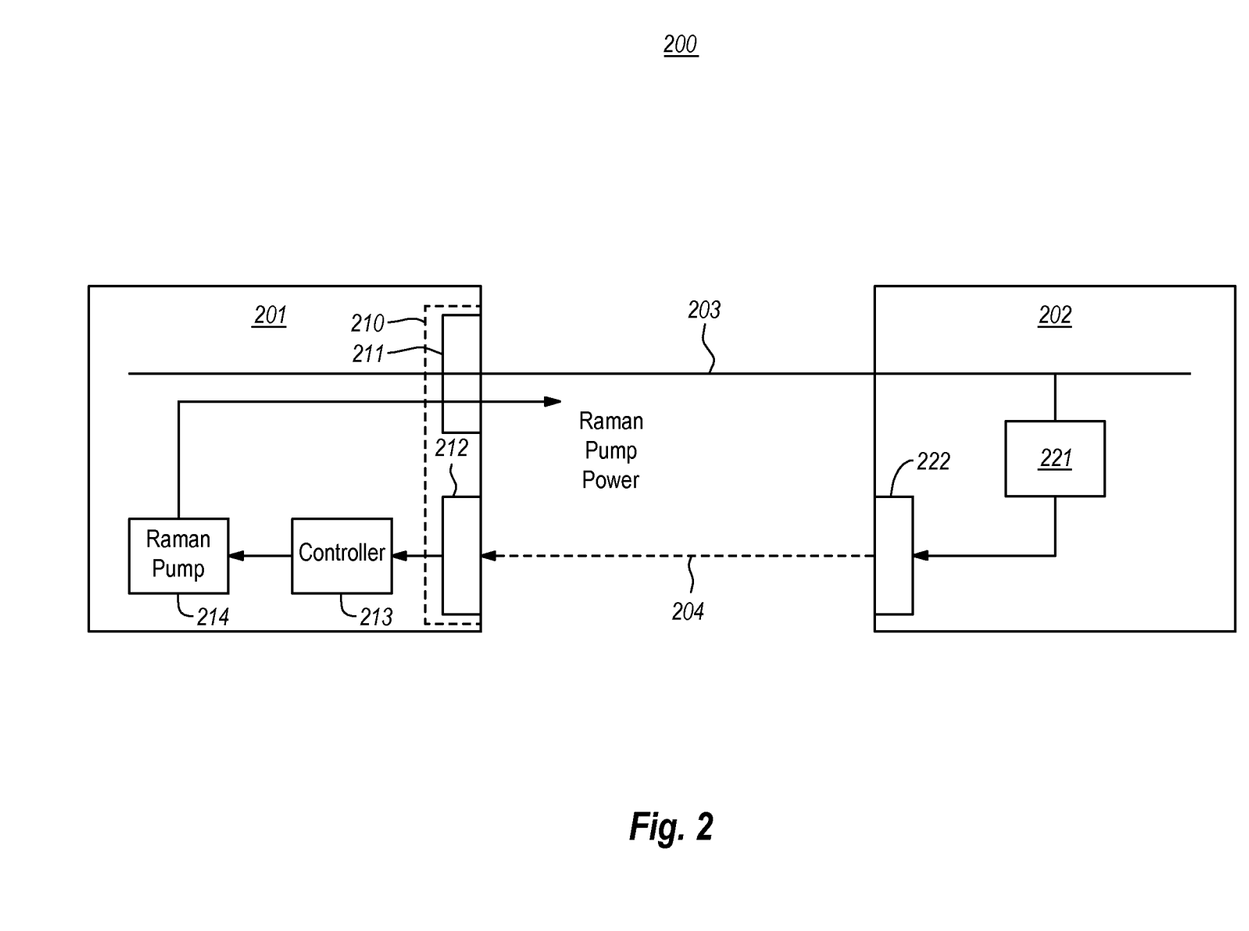
FIG. 2 illustrates an optical system that employs Raman amplification to amplify an optical signal communicated between two optical nodes in an optical system, and which adjusts Raman amplification in accordance with a measured quality parameter of the optical signal.

FIG. 2 illustrates an optical system 200 that includes a first optical node 201 and a second optical node 202. For instance, the optical system 200 might be an optical communication link. Optical signals are communicated between the first optical node 201 and the second optical node 202 over an optical channel 203, which comprises at least one optical fiber. In an embodiment in which the optical system 200 is a DWDM optical system, the signal includes multiple optical wavelength channels, each having an associated optical wavelength signal. In long-haul or ultra long-haul optical systems, the optical channel may be over 100 kilometers in optical length and perhaps may reach over 1000 kilometers in optical length, optical length being the distance that the optical signal travels over the optical channel. The optical channel 203 includes one or more optical fibers, but may also include other optical elements as well such as repeaters, optical add/drop multiplexers, remote optically pumped amplifiers, and the like.

The optical system 200 may be in a repeatered or unrepeatered system, and may operate in a terrestrial and/or submarine optical fiber link. If the optical system 200 is used in the optical communication system 100 of FIG. 1, and if the optical communication system 100 were an unrepeatered optical system, the first optical node 201 of FIG. 2 may be, may include, or may be included within the terminal 101 of FIG. 1. In the unrepeatered case, the second optical node 202 of FIG. 2 may be, may include, or may be included within either terminal 102 of FIG. 1.

If the optical system 200 is used in the optical communication system 100 of FIG. 1, and if the optical communication system 100 were a repeatered optical system, the first optical node 201 of FIG. 2 may be, may include, or may be included within the terminal 101 of FIG. 1, one of the repeaters (e.g., repeater 115(1)), or an optical add-drop multiplexer or any other powered optical node between terminals 101 and 102. In the repeatered case, the second optical node 202 of FIG. 2 may be, may include, or may be included within either terminal 102 of FIG. 1, one of the repeaters (e.g., repeater 115(3)), or an optical add-drop multiplexer or any other powered optical node between optical transmission node 201 and the terminal 102.

The remaining components of the optical system 200 and the operation of the optical system will now be described with respect to FIG. 3, which illustrates a flowchart of a method 300 of adaptively Raman amplifying an optical signal. Accordingly, the optical system 200 of FIG. 2 will now be described with respect to the flowchart of the method 300 of FIG. 3.

Figure 3:
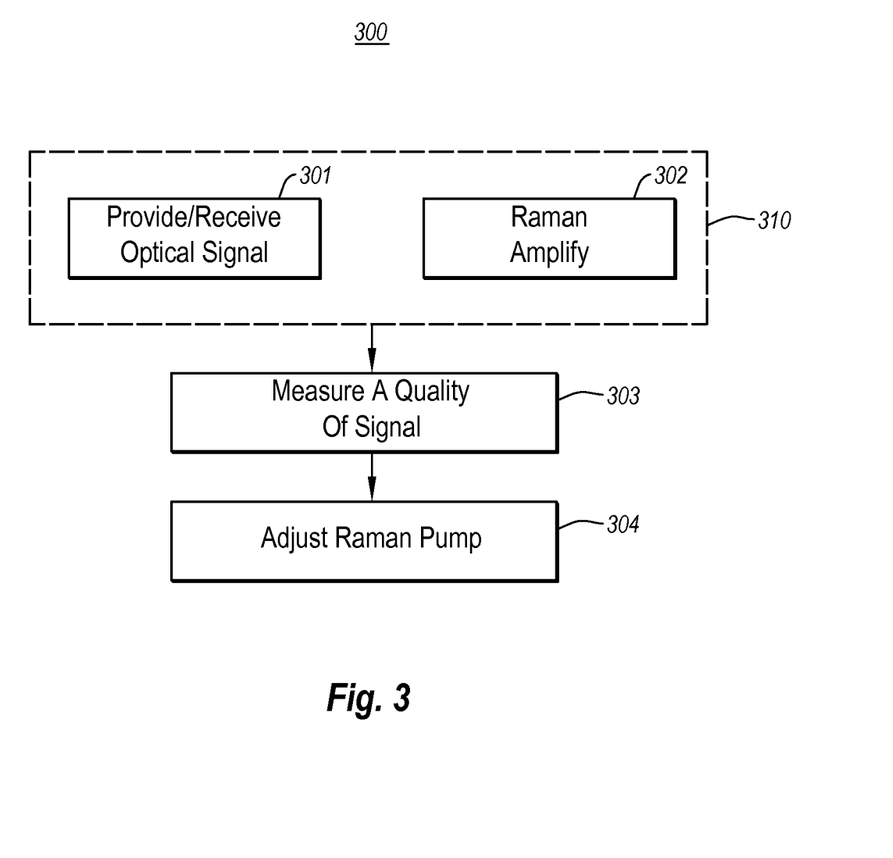
FIG. 3 illustrates a flowchart of a method for adjusting Raman amplification in an optical system.

Referring back to FIG. 2, the optical node 201 includes an optical channel interface 211 for interfacing with the optical signal on the optical channel 203 (act 301 of FIG. 3). For instance, in the case of the optical signal traveling from optical node 201 to optical node 202, the optical channel interface 211 provides the optical signal onto the optical channel. Alternatively, in the case of the optical signal traveling from the optical node 202 to the optical node 201, the optical channel interface 211 receives the optical signal from the optical channel 203. That said, neither of the optical nodes 201 and 202 need be the actual originator or destination of the optical signal. Rather, either or both nodes 201 and 202 may simply be a repeater. Furthermore, although the optical system 200 may be an optical communication link, the principles described herein apply regardless of whether or not there are zero, one, or more repeaters intervening within the optical channel 203.

A Raman pump 214 provides Raman pump power into the optical fiber (act 302) to thereby perform Raman amplification of the optical signal in the optical fiber. In the case of the signal traveling from optical node 201 to the optical node 202, the Raman pump 214 is a forward (co-propagating with respect to the signal) Raman pump and the Raman pump power performs forward Raman amplification on the optical signal. In the case of the signal traveling from optical node 202 to the optical node 201, the Raman pump 214 is a backward (counter-propagating with respect to the signal) Raman pump and the Raman pump power performs backward Raman amplification on the optical signal.

The acts 301 and 302 are surrounded by a dashed box 310, which symbolically represents that the acts may be performed substantially simultaneously. For instance, in the case of forward Raman amplification, the interface 211 provides the optical signal onto the optical channel 203 at substantially the same time as the forward Raman pump power is provided into the optical fiber. Likewise, in the case of backward Raman amplification, the interface 211 receives the optical signal from the optical channel 203 only slightly after the backward Raman pump power that amplified the signal is asserted onto the optical channel.

Referring to FIG. 2, the second node 202 has thereon a signal quality determination mechanism 221 that measures a quality measurement of the optical signal (act 303 of FIG. 2). Examples of quality measurements include bit error rate (BER), optical signal to noise ratio (OSNR), and signal quality (Q). The signal quality measurement may be based on one, some, or even all of the optical wavelength channels in the optical signal received at the second node 202 from the first node 201. For instance, the quality measurement may be a compound measurement of the bit error rates for each of the optical wavelength channels.

The signal quality determination mechanism 221 uses a feedback mechanism to provide information regarding the signal quality measurement back to the first node 201. For instance, the second node 202 includes a communication interface 222 that transmits the information from the quality measurement from the second node 202 back to the first node 201 (as represented by arrow 204). For instance, the bit error rate of the optical signal transmitted by the optical node 201 may be measured at the optical node 202. Then, the optical node 202 may transmit a signal representing the quality measurement (the bit error rate in this example) back to the optical node 201.

The quality measurement is received at the first node via a communication interface 212. The combination of the optical communication interfaces 211 and 212 may be thought of as a single communication interface, with elements 211 and 212 each being considered instead channel interface portions.

A controller 213 uses the quality measurement to control at least one parameter of the Raman pump 214 (act 304). As an example, the controller 213 may control a total optical pump power of the Raman pump 214. The controller 213 may perhaps dither on the parameter to measure the effect of the dithering on the measured quality parameter. This dithering may occur across one or more parameters of the Raman pump until the signal quality is improved to approach a maximum signal quality. In any case, the controller 213 may continuously receive quality measurements from via the communications interface 212, to allow for continuous adjustment of the Raman pump.

Some Raman pumps include optical pump sources of multiple wavelengths. An example of such a Raman pump is illustrated and described below with respect to FIG. 4. The controller 213 may dither through various relative powers of the optical pump source in an attempt to improve the measured signal quality parameter. If one or more of the optical pump sources were tunable, the controller 213 may dither also the frequency of the tunable optical pump source.

Figure 4:
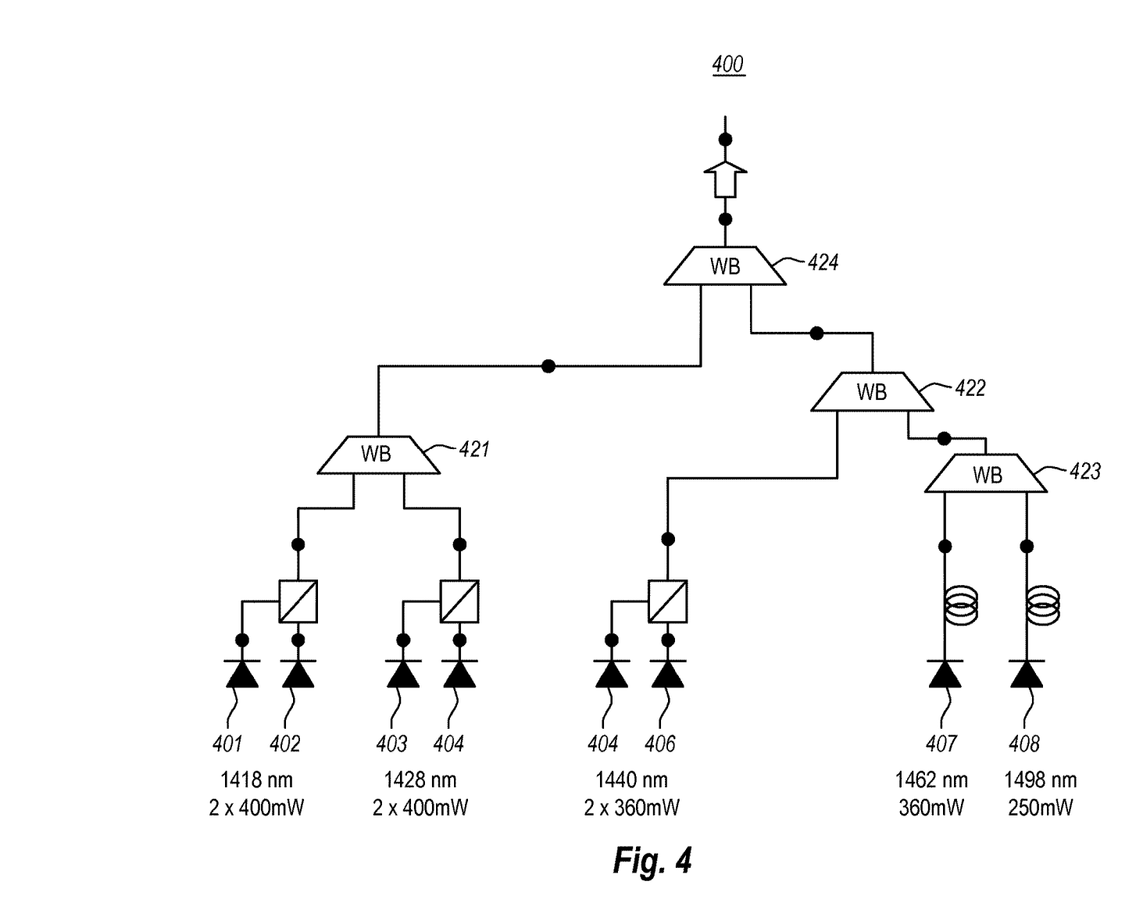
FIG. 4 illustrates an optional configuration for the Raman pump of FIG. 2.
Figure 5:
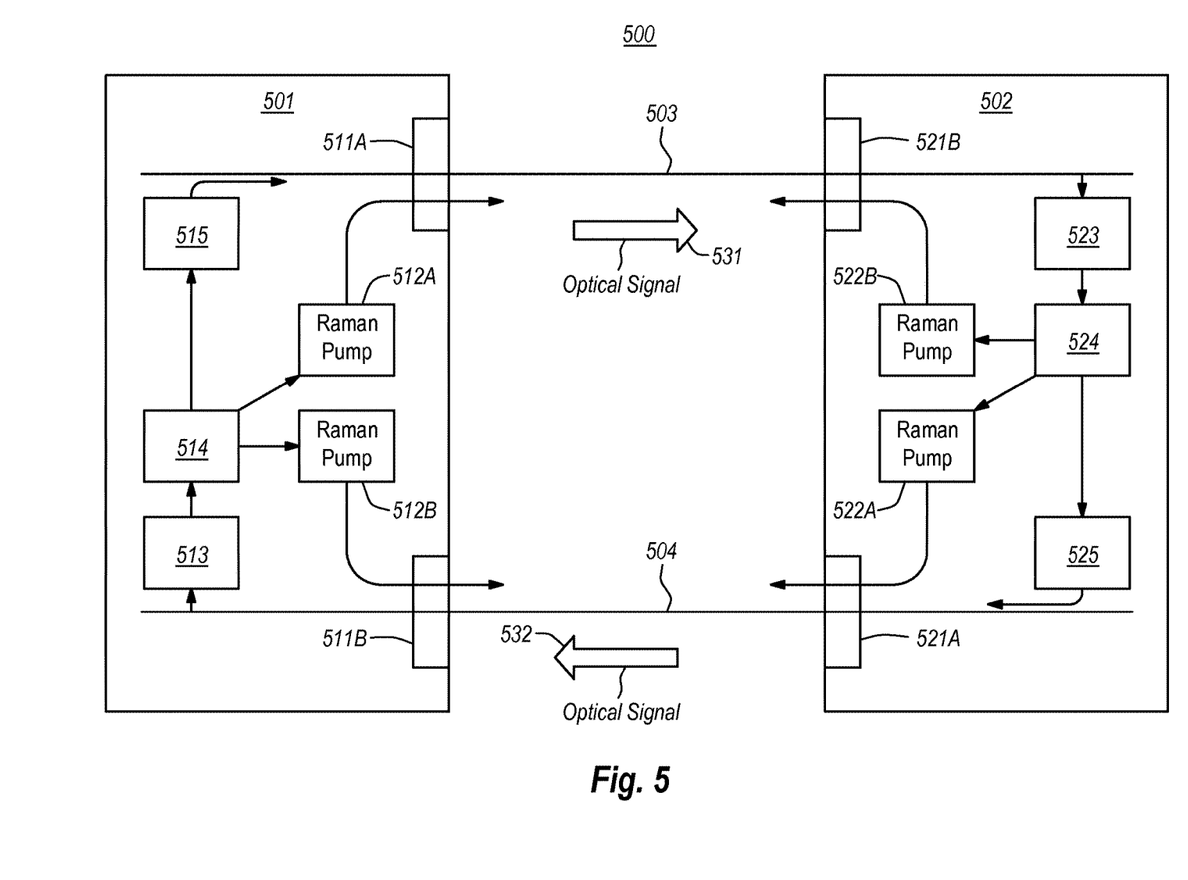
FIG. 5 illustrates a bi-directional optical system that employs Raman amplification to amplify an optical signal communicated between two optical nodes in an optical system, and which adjusts Raman amplification in accordance with a measured quality parameter of the optical signal.

FIG. 4 illustrates an optional configuration 400 for the Raman pump 214 of FIG. 2, but may also represent an example Raman pump for the Raman pumps illustrated and described with respect to FIG. 5. There are eight lasers total 401 through 408 including two lasers 401 and 402 operating at 1418 nm wavelength and a power of 400 mW each, two lasers 403 and 404 operating at 1428 nm wavelength and a power of 400 mW each, two lasers 405 and 406 operating at 1440 nm wavelength and a power of 360 mW each, one laser 407 operating at 1462 nm wavelength and a power of 360 mW, and one laser 408 operating at 1498 nm wavelength and a power of 250 mW. The outputs from these lasers are combined by a network of multiplexers 421 through 424, for output as Raman pump power.

FIG. 5 illustrates an optical system 500 in which two optical nodes 501 and 502 communicate bidirectionally over two optical channels 503 and 504. The optical nodes 501 and 502 may be, for example, as described above for the optical nodes 201 and 202. The optical node 501 transmits the optical signal 531 to the optical node 502 over channel 503, and the optical node 502 transmits the optical signal 532 in the opposite direction to the optical node 501 using optical channel 504. Although four Raman pumps 512A, 512B, 522A and 522B are shown in FIG. 5, the principles described herein may operation with one, two or three of such Raman pumps as well.

The optical node 501 transmits optical signal 531 onto the optical channel 503 using the optical channel interface 511A. As will be described herein below, the optical signal 531 may include data representing a signal quality measurement of the optical signal 532 travelling in the opposite direction. If forward Raman amplification is employed in this optical channel 503, a forward Raman pump 512A directs forward Raman pump power onto the optical channel 503 which causes distributed forward Raman amplification of the optical signal 531 within the optical channel 503. The optical signal 531 is received into the optical node 502 by the optical channel interface 521B. If backward Raman amplification is employed in this optical channel 503, a backward Raman pump 522B directs backward Raman pump power onto the optical channel 503 which causes distributed backward Raman amplification of the optical signal 531 within the optical channel 503.

The signal quality measurement mechanism 523 measures a signal quality parameter of the received optical signal 531, and provides the measured quality parameter to the controller 524. The controller 524 then adaptively adjusts the backward Raman pump 522B. If data representing the quality measurement of the optical signal 532 were included within the optical signal 531, the data may be extracted by the signal quality measurement mechanism 523, and used to adjust the forward Raman pump 522A. For instance, the total power, the relative wavelength powers, or the wavelength(s) of the forward and/or backward Raman pumps may be adjusted. In addition, data representing the measured quality parameter (e.g., bit error rate, optical signal to noise ratio, signal quality, etc.) of the optical signal 531 may be provided onto the optical signal 532 by component 525. The data may be any data from which a measured quality parameter may be inferred by the signal quality measurement mechanism 513 at the optical node 501.

As an example, the data represented the measured quality parameter may be inserted into the overhead of one or more of the optical wavelength seconds of the optical signal 532. An optical signal comprises both data and "overhead". The overhead may comprise forward error correction, data organization information ("framing"), faults and alarms, or other information that does not depend on the exact data payload. Overhead may include user defined data to transmit any type of information. In accordance with embodiments described herein, this overhead information may also include signal quality information measured in one node of an optical communication link and transmitted over a return optical signal to a second node in an optical communication link.

The optical node 502 transmits optical signal 532 onto the optical channel 504 using the optical channel interface 521A. If forward Raman amplification is employed in this optical channel 504, a forward Raman pump 522A directs forward Raman pump power onto the optical channel 504 which causes distributed forward Raman amplification of the optical signal 532 within the optical channel 504. The optical signal 532 is received into the optical node 501 by the optical channel interface 511B. If backward Raman amplification is employed in this optical channel 504, a backward Raman pump 512B directs backward Raman pump power onto the optical channel 504 which causes distributed backward Raman amplification of the optical signal 532 within the optical channel 504.

The signal quality measurement mechanism 513 measures a signal quality parameter of the received optical signal 532, and provides the measured quality parameter to the controller 514. The controller 514 then adaptively adjusts the backward Raman pump 512B. If data representing the quality measurement of the optical signal 531 were included within the optical signal 532, the data may be extracted by the signal quality measurement mechanism 513, and used to adjust the forward Raman pump 512A. For instance, the total power, the relative wavelength powers, or the wavelength(s) of the forward and/or backward Raman pumps may be adjusted. In addition, data representing the measured quality parameter (e.g., bit error rate, optical signal to noise ratio, signal quality, etc.) of the optical signal 532 may be provided onto the optical signal 531 by component 515. The data may be any data from which a measured quality parameter may be inferred by the signal quality measurement mechanism 523 at the optical node 502.

The principles described herein are not restricted to optical links in which both forward and backward Raman amplification occur. Even where both forward and backward Raman amplification occur, the principles described herein are not limited to the need to adaptively adjust both forward and backward Raman amplification. The principles described herein may be implemented regardless of the complexity of the optical channel connecting two optical nodes. For instance, optical channel 503 may be as simple as a single optical fiber. To add a little complexity, there might also be one or more remote optical pumped amplifiers in the optical channel. To add further complexity, there may be multiple repeaters or other powered components within the optical channel 503. Those repeaters or powered components may themselves employ distributed Raman amplification and/or discrete amplification. In one embodiment, the optical channel includes optical nodes that communicate using the adaptive principles of Raman pump adjustment described herein. Thus, there could be nested layers of adaptive Raman pump adjustment performed using the principles described herein.

Accordingly, a flexible mechanism for adaptively adjusting Raman pump power has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication link comprising:
   a first node and a second node;
   the first node comprising an optical channel interface configured to transmit an optical signal onto an optical channel comprising an optical fiber towards the second node, the optical signal comprising a plurality of optical wavelength signals;
   the first node also comprising a Raman pump configured to provide Raman pump power into the optical fiber to thereby perform Raman amplification of the optical signal in the optical fiber,
   the second node comprising a communication interface configured to transmit, from the second node to the first node, information associated with a quality measurement of at least one of the plurality of optical wavelength signals transmitted by the first node to the second node; and
   the first node further comprising a controller configured to control at least one parameter of the Raman pump in response to the information associated with the quality measurement;
   wherein the quality measurement comprises a bit error rate;
   wherein the Raman pump comprises multiple optical pump sources, at least some of the optical pump sources configured to operate at different wavelengths and at different powers; and
   wherein, to control the at least one parameter of the Raman pump, the controller is configured to dither one or more parameters of different ones of the optical pump sources in order to determine how to improve the quality measurement.

2. The optical communication link in accordance with claim 1, wherein the Raman pump is a forward Raman pump.

3. The optical communication link in accordance with claim 1, wherein the controller is configured to control the at least one parameter of the Raman pump in response to the information associated with the quality measurement to improve a signal quality of the optical signal received at the second node.

4. The optical communication link in accordance with claim 1, wherein the communication interface is configured to use an optical signal overhead of at least one of a second plurality of optical wavelength signals transmitted by the second node to the first node in order to transmit the information associated with the quality measurement to the first node.

5. The optical communication link in accordance with claim 1, wherein the quality measurement is based on some but not all of the plurality of optical wavelength signals transmitted by the first node to the second node.

6. The optical communication link in accordance with claim 1, wherein the information associated with the quality measurement comprises the bit error rate.

7. An optical communication link comprising:
   a first node and a second node;
   the first node comprising an optical channel interface configured to transmit an optical signal onto an optical channel comprising an optical fiber towards the second node, the optical signal comprising a plurality of optical wavelength signals;
   the first node also comprising a Raman pump configured to provide Raman pump power into the optical fiber to thereby perform Raman amplification of the optical signal in the optical fiber;
   the second node comprising a communication interface configured to transmit, from the second node to the first node, information associated with a quality measurement of at least one of the plurality of optical wavelength signals transmitted by the first node to the second node; and
   the first node further comprising a controller configured to control at least one parameter of the Raman pump in response to the information associated with the quality measurement;
   wherein the quality measurement comprises a bit error rate; and
   wherein the quality measurement is based on all of the plurality of optical wavelength signals transmitted by the first node to the second node.

8. The optical communication link in accordance with claim 7, wherein:
   the Raman pump comprises multiple optical pump sources, at least some of the optical pump sources configured to operate at different wavelengths and at different powers; and
   to control the at least one parameter of the Raman pump, the controller is configured to dither one or more parameters of different ones of the optical pump sources in order to determine how to improve the quality measurement.

9. The optical communication link in accordance with claim 8, wherein the controller is configured to dither at least one of frequencies of the optical pump sources and relative powers of the optical pump sources.

10. A first node of an optical communication link, the first node comprising:
    at least one interface configured to transmit an optical signal onto an optical channel comprising an optical fiber to a second node, the optical signal comprising a plurality of optical wavelength signals, the at least one interface further configured to receive from the second node a quality measurement of at least one of the plurality of optical wavelength signals transmitted by the first node to the second node;
    a Raman pump configured to provide Raman pump power into the optical fiber to thereby perform Raman amplification of the optical signal in the optical fiber; and
    a controller configured to control at least one parameter of the Raman pump in response to the received quality measurement;
    wherein the quality measurement comprises a bit error rate of the at least one of the plurality of optical wavelength signals;
    wherein the Raman pump comprises multiple optical pump sources, at least some of the optical pump sources configured to operate at different wavelengths and at different powers; and wherein, to control the at least one parameter of the Raman pump, the controller is configured to dither one or more parameters of different ones of the optical pump sources in order to determine how to improve the quality measurement.

11. The first node in accordance with claim 10, wherein:
the at least one interface comprises a first channel interface portion configured to provide the optical signal onto the optical channel and a second channel interface portion configured to receive the quality measurement from the second node, and
the Raman pump is a forward Raman pump.

12. The first node in accordance with claim 11, wherein:
the optical channel is a first optical channel,
the optical signal is a first optical signal,
the plurality of optical wavelength signals is a first plurality of optical wavelength signals, and
the second channel interface portion is further configured to receive a second optical signal over a second optical channel from the second node, the second optical signal comprising a second plurality of optical wavelength signals.

13. The first node in accordance with claim 12, wherein the second channel interface portion is configured to receive the quality measurement from an optical signal overhead of at least one of the second plurality of optical wavelength signals transmitted by the second node to the first node.

14. The first node in accordance with claim 10, wherein the controller is configured to dither at least one of frequencies of the optical pump sources and relative powers of the optical pump sources.

15. A method for a first node in an optical communication link performing distributed Raman amplification, the method comprising:
transmitting, from an optical channel interface of the first node, an optical signal onto an optical channel that comprises an optical fiber and that leads to a second node in the optical communication link, the optical signal comprising a plurality of optical wavelength signals;
providing, by a Raman pump, Raman pump power into the optical fiber to thereby perform Raman amplification of the optical signal in the optical fiber;
receiving a signal quality measurement from the second node at the first node; and
controlling, at the first node, at least one parameter of the Raman pump in response to the signal quality measurement;
wherein the signal quality measurement comprises a bit error rate measurement;
wherein the Raman pump comprises multiple optical pump sources, at least some of the optical pump sources configured to operate at different wavelengths and at different powers; and
wherein controlling the at least one parameter of the Raman pump comprises dithering one or more parameters of different ones of the optical pump sources in order to determine how to improve the quality measurement.

16. The method in accordance with claim 15, wherein receiving the signal quality measurement and controlling the at least one parameter of the Raman pump are performed repeatedly to improve the signal quality measurement over time.

17. The method in accordance with claim 15, wherein the Raman pump is a forward Raman pump.

18. The method in accordance with claim 15, wherein:
the optical channel is a first optical channel,
the optical channel interface is a first optical channel interface,
the optical signal is a first optical signal,
the plurality of optical wavelength signals is a first plurality of optical wavelength signals, and
the method further comprises:
receiving, at a second optical channel interface of the first node, a second optical signal over a second optical channel from the second node, the second optical signal comprising a second plurality of optical wavelength signals.

19. The method in accordance with claim 18, wherein the second optical channel interface receives the signal quality measurement from the second node.

20. The method in accordance with claim 19, wherein the signal quality measurement is in an optical signal overhead of at least one of the second plurality of optical wavelength signals transmitted by the second node to the first node.

* * * * *